United States Patent

Boudry et al.

[11] Patent Number: 6,115,451
[45] Date of Patent: Sep. 5, 2000

[54] ARTIFACT ELIMINATION IN DIGITAL RADIOGRAPHY

[75] Inventors: John Moore Boudry, Waukesha; Rowland Frederick Saunders, Hartland, both of Wis.; Barry Fredric Belanger, Paris, France

[73] Assignee: General Electric Company, Milwaukee, Wis.

[21] Appl. No.: 09/218,194

[22] Filed: Dec. 22, 1998

[51] Int. Cl.[7] ........................................................ G01T 1/20
[52] U.S. Cl. ................ 378/98.8; 250/208.1; 250/370.09; 378/98.12
[58] Field of Search .................... 378/98.8, 207, 378/98.12; 250/370.09, 208.1, 370.11

[56] References Cited

U.S. PATENT DOCUMENTS

| | | | |
|---|---|---|---|
| 5,038,369 | 8/1991 | Nishiki | 378/62 |
| 5,510,623 | 4/1996 | Sayag et al. | 250/370.11 |
| 5,668,375 | 9/1997 | Petrick et al. | 250/370.09 |

*Primary Examiner*—David P. Porta
*Attorney, Agent, or Firm*—Dewitt Ross and Stevens; Christian G. Cabou; Phyllis Y. Price

[57] ABSTRACT

Described herein is a method of radiographic imaging providing low access time prior to the start of a user-requested X-ray exposure, while at the same time reducing or eliminating the imaging artifacts associated with short access times. The method includes the steps of exposing a radiographic detector for a time period $t_e$; reading the radiographic detector to obtain an exposure reading; reading the radiographic detector to obtain an offset reading, wherein the offset reading is obtained after a time period $t_w$ greater than $t_e$; and subtracting the offset reading from the exposure reading. Where the detector is subjected to readings lasting for periods $t_r$ prior to taking the exposure reading, detector readings lasting for $t_r$ are also taken during $t_w$. After the final $t_r$ reading is taken during $t_w$, the offset reading is then preferably taken after a period equal to $t_e$. As a result, approximately the same detector sampling scheme is used both prior to and after the exposure reading (i.e., approximately the same operating conditions are imposed on the detector prior to the exposure reading and the offset reading), thereby providing more accurate offset readings and less image artifacts when the offset reading is subtracted from the exposure reading.

20 Claims, 2 Drawing Sheets

ARTIFACT ELIMINATION IN DIGITAL RADIOGRAPHY

FIELD OF THE INVENTION

This disclosure concerns an invention relating generally to digital radiographic imaging, and more specifically to methods for enhancing image quality in digital radiographs.

BACKGROUND OF THE INVENTION

The classic radiograph or "X-ray" image is obtained by situating the object to be imaged between an X-ray emitter and an X-ray detector made of photographic film. Emitted X-rays pass through the object to expose the film, and the degree of exposure at the various points on the film are largely determined by the density of the object along the path of the X-rays.

It is now common to utilize solid-state digital X-ray detectors (e.g., an array of switching elements and photo-sensitive elements such as photodiodes) in place of film detectors. The charges generated by the X-rays on the various points of the detector are read and processed to generate a digital image of the object in electronic form, rather than an analog image on photographic film. Digital imaging is advantageous because the image can later be electronically transmitted to other locations, subjected to diagnostic algorithms to determine properties of the imaged object, and so on.

During the digital imaging process, the image is generally not produced directly from the detector reading. Instead, the detector reading is processed to produce a cleaner image. In particular, the image is usually processed to eliminate the "offset", which arises owing to the charge state of the detector prior to the time the exposure is made. The qualities of the offset are determined by the detector's current leakage, temperature, background radiation, and a variety of other factors. The offset is desirably eliminated from the detector reading to provide better image quality.

A common method of eliminating the offset is illustrated in FIG. 1, which illustrates the radiographic imaging process over time. The detector is read at periodic time intervals $t_r$ so that the image is regularly updated. The intervals $t_r$ are spaced by the intervals $t_e$, which represent the desired exposure time as set by the X-ray technician. When a technician requests an exposure at time $T_a$ the X-ray system activates the emitter as soon as the next full interval $t_e$ occurs. The detector is then read at the next interval $t_r$ to obtain the exposure reading, which includes the preexisting offset of the detector. The detector is allowed to settle for the following interval $t_e$ and the detector is then read at the next interval $t_r$ to obtain an approximate measure of the offset. In FIG. 1, the interval $t_e$ between the exposure reading and the offset reading is also designated by $t_w$, the "wait" time between the two readings. The image is then produced by subtracting the offset reading from the prior exposure reading, and perhaps subjecting it to other image processing algorithms as well. An alternative process is illustrated in FIG. 2, where the readings made prior to submission of an exposure request are stored for possible use as offset readings. When an exposure is requested at time $T_a$, the reading taken during the interval $t_r$ prior to the exposure interval $t_e$/wait interval $t_w$ is used as the offset reading, and the subsequent read interval $t_r$ is used to obtain the exposure reading. The offset reading is then subtracted from the subsequent exposure reading.

The imaging schemes of FIGS. 1 and 2 result in good image quality, but they suffer from a significant drawback: when an exposure is requested, an access time $t_a$ is incurred before the exposure is actually made, and this period $t_a$ could be as long as approximately $t_e + t_r$. This is illustrated in FIGS. 1 and 2 by the exemplary request time $T_a$, wherein a technician requests an exposure just after an interval $t_e$ begins; the X-ray system must wait for the next full interval $t_e$ prior to activating the emitter. The access time $t_a$ prior to the start of the exposure could be substantial, particularly since $t_e$ could be as long as 2 seconds or more. This is inconvenient, especially where an exposure is desired during a particular well-defined time period. The inventors feel that in general, a high-quality X-ray system should be able to initiate an exposure within approximately 0.7 seconds after being requested to do so (i.e., $t_a \leq 0.7$ seconds), and should provide the processed final image within 5 seconds of the request.

FIG. 3 then illustrates an alternate imaging scheme which was developed to reduce the delay (i.e., the access time $t_a$). Detector readings are taken at time intervals $t_r$ which are spaced by small time intervals $t_s$. When an exposure is requested at time $T_a$ an exposure is made for interval $t_e$ at the end of the current $t_s + t_r$ cycle (e.g., at the end of the current period $t_r$ in the case where exposure is requested during $t_r$, or at the end of the next period $t_r$ in the case where an exposure is requested during $t_s$). Thus, the delay prior to an exposure may be significantly reduced because the access time $t_a$ will never exceed $t_s + t_r$ (where $t_s$ is small, and generally less than $t_e$). After the exposure interval $t_e$, the exposure reading is taken during period $t_r$. The detector is then allowed to settle for another time interval $t_e$/wait interval $t_w$ to return it to an approximation of its pre-exposure state, and the offset reading is taken during the next interval $t_r$. The image may then be produced by subtracting the offset reading from the exposure reading, and perhaps subjecting it to other image processing algorithms.

While the imaging scheme of FIG. 3 eliminates the undesirably long access time, it suffers from the drawback that it results in increased image artifacts, presumably because the offset reading taken after exposure is an inexact representation of the true pre-exposure offset. Unlike the imaging scheme of FIG. 2, this cannot be corrected by taking the offset reading prior to making the exposure since the exposure time $t_e$, which will generally be set by automatic exposure controls, is not known prior to submission of the exposure request at time $T_a$.

Thus, in prior digital radiographic systems, one has been forced to choose between (1) an unacceptably long potential access time $t_a$ prior to the time X-ray exposures are made; or (2) greater image artifacts, i.e., degradation of image quality, owing to less-than-ideal offset readings.

SUMMARY OF THE INVENTION

The invention, which is defined by the claims set out at the end of this disclosure, is directed to a method of radiographic imaging which greatly reduces access times before user-requested exposures are initiated, and which also eliminates image artifacts to a substantial degree. In preferred embodiments of the invention, the method includes the steps of exposing a radiographic detector for a time period $t_e$; reading the radiographic detector to obtain an exposure reading; reading the radiographic detector to obtain an offset reading, wherein the offset reading is obtained after a time period $t_w$ greater than $t_e$; and subtracting the offset reading from the exposure reading. This method is in contrast to those described above and illustrated in FIGS. 1–3, wherein $t_w = t_e$.

During the period $t_w$, the detector is preferably read at least once, but these readings are not used as the offset reading. Most preferably, where the detector is subjected to readings lasting for periods $t_r$ prior to taking the exposure reading, the readings taken during $t_w$ also last for $t_r$ so that the same sampling scheme is used both prior to and after the exposure reading is taken. After the final $t_r$ reading is taken during $t_w$, the offset reading is then preferably taken after a period equal to $t_e$; therefore, $t_w \geq t_r + t_e$. More specifically, where the $t_r$ readings prior to and after the exposure reading are spaced by periods $t_s$, this is expressed by $t_w = N(t_s + t_r) + t_e$, wherein N is an integer number greater than or equal to 1 which corresponds to the number of detector readings taken between the exposure and offset readings.

In the various embodiments of the invention, both the exposure and the offset readings can be taken for a time period $t_R$, wherein $t_R$ need not be equal to $t_r$. Most preferably, $t_R \geq t_r$.

Further advantages, features, and objects of the invention will be apparent from the following detailed description of the invention in conjunction with the associated drawings.

DETAILED DESCRIPTION OF PREFERRED EMBODIMENTS OF THE INVENTION

Figure 4:
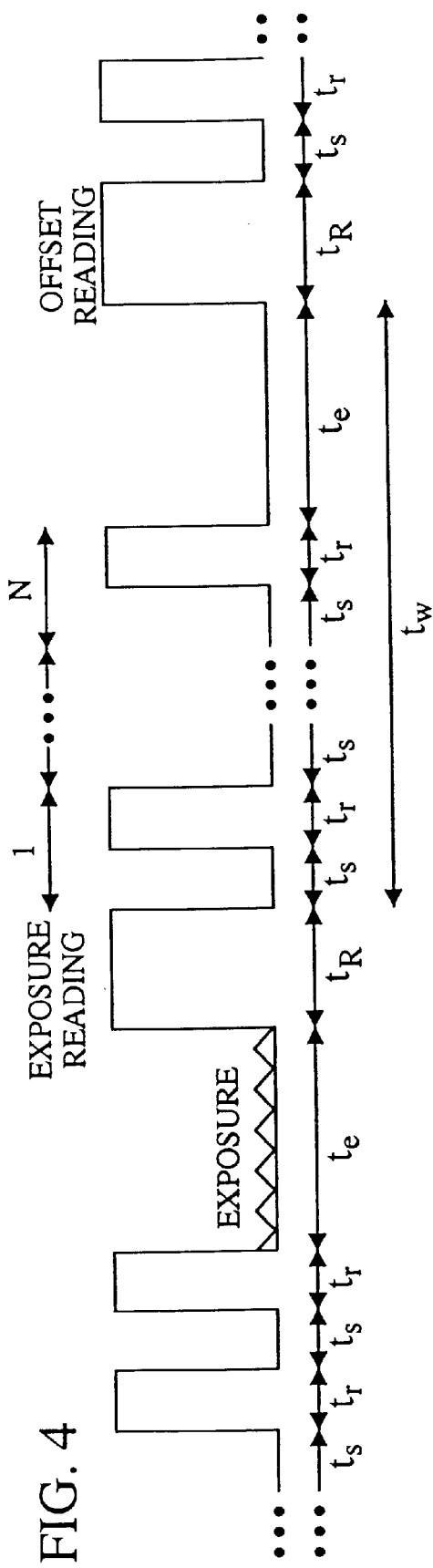
FIG. 4 is a plot illustrating an exemplary imaging scheme of the present invention as it occurs over time.

A new imaging scheme has been developed which addresses the aforementioned problems and which results in both decreased access time and reduced image artifacts. This scheme, which is illustrated in FIG. 4, takes detector readings during time intervals $t_r$. The intervals $t_r$ are spaced by intervals $t_s$ with $t_s$ being small and usually less than probable later exposure times $t_e$. When an exposure is requested, the X-ray emitter will be activated for an exposure interval $t_e$ at the end of the present $t_s + t_r$ cycle (e.g., at the end of the current interval $t_r$ where exposure is requested during $t_r$, or at the end of the next interval $t_r$ where an exposure is requested during $t_s$). The detector is then read for interval $t_R$, wherein $t_R$ is preferably greater than or equal to $t_r$, to obtain the exposure reading. The timing then reverts to the pre-exposure state of $t_s$ intervals followed by $t_r$ intervals wherein detector readings are made. The $t_s + t_r$ cycle is repeated N times, where N is some integer number. These N cycles are followed by a delay lasting for interval $t_e$, and then by another detector reading lasting for interval $t_R$. This detector reading is used as the offset reading, and is subtracted from the exposure reading to refine the image. Timing is then restored to the pre-exposure pattern of $t_s + t_r$ cycles until another exposure is requested.

Figure 1:
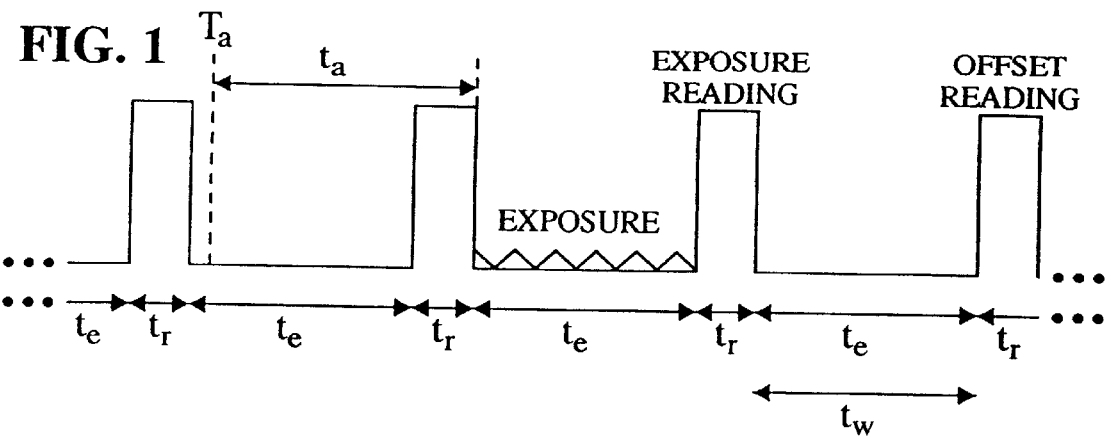
FIGS. 1–3 are plots illustrating the aforementioned imaging schemes as they occur over time.
Figure 2:
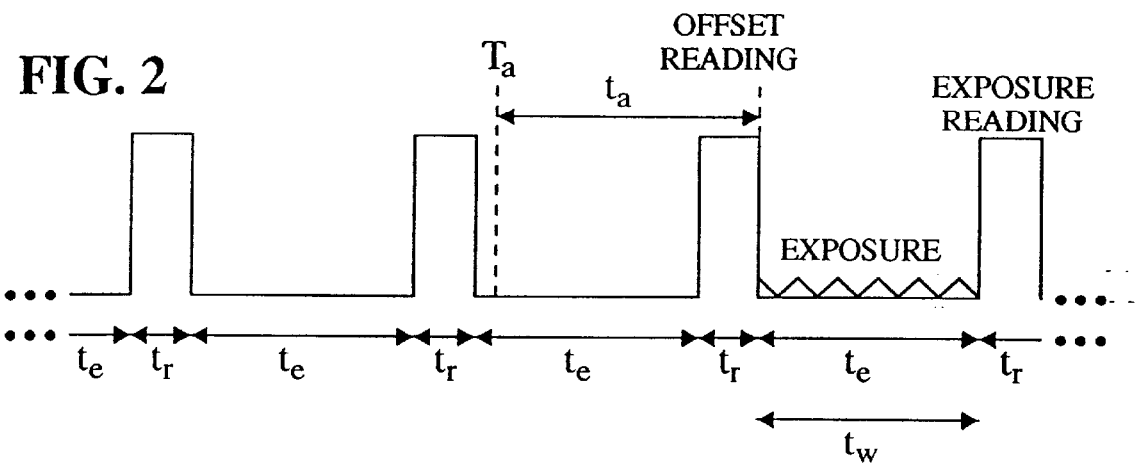
Figure 3:
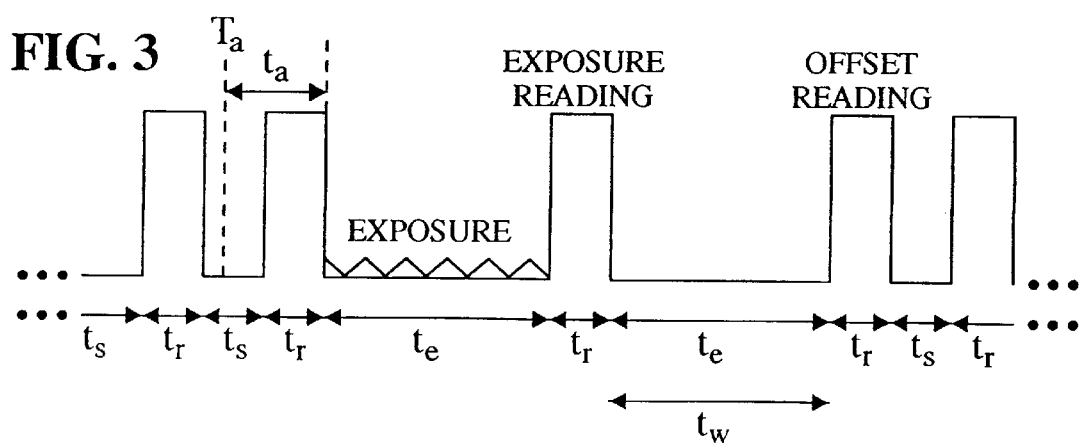

This imaging scheme has been found to offer access times comparable to those of the scheme of FIG. 3, since access time will never exceed $t_s + t_r$. This scheme also offers artifact elimination which is at least comparable to that obtained by the schemes of FIGS. 1 and 2. The enhanced artifact elimination is believed to occur because the offset is read after the detector is restored to a condition simulating that prior to exposure: both prior to and after the exposure, the detector is being subjected to several readings during cycles of $t_s + t_r$, and is then read for an interval $t_R$ following the interval $t_e$. Since the very act of taking detector readings can affect the values of these readings, subjecting the detector to readings having the same frequency and duration prior to taking the exposure reading and the offset reading is believed to result in more appropriate offset readings, and thus less artifacts when the offset reading is removed from the exposure reading.

In this imaging scheme, images of particularly high quality have been found to result when N is chosen such that 0.5 second $\geq N(t_s + t_r) \leq 2$ seconds, though this may vary depending on the type and quality of the detector. In general, it is expected that accuracy will increase if N is greater than approximately 2–3, and that more appropriate offset values (and thus enhanced artifact removal) will be obtained where N is larger. Although larger N may result in better artifact elimination, greater delay in receiving the finally-processed image will result, and thus diminishing returns are expected for greater values of N.

The invention is not intended to be limited to the preferred embodiments described above, but rather is intended to be limited only by the claims set out below. Thus, the invention encompasses all alternate embodiments that fall literally or equivalently within the scope of these claims.

What is claimed is:

1. A method of radiographic imaging comprising:
   a. exposing a radiographic detector for a time period $t_e$;
   b. reading the radiographic detector for a time period $t_R$ to obtain an exposure reading;
   c. after a time period $t_w$ greater than $t_e$, reading the radiographic detector to obtain an offset reading;
   d. subtracting the offset reading from the exposure reading.

2. The method of claim 1 wherein $t_w \geq 0.5$ second.

3. The method of claim 1 wherein 0.5 second $\leq t_w \leq 2$ seconds.

4. The method of claim 1 wherein the detector is read at least once during $t_w$.

5. The method of claim 1 further comprising reading the radiographic detector for at least one time period $t_r$ prior to obtaining the offset reading,
   and wherein $t_w \geq t_r + t_e$.

6. The method of claim 5 wherein $t_R$ is not equal to $t_r$.

7. The method of claim 5 wherein $t_R \geq t_r$.

8. The method of claim 5 further comprising reading the radiographic detector for $t_r$ at least once during $t_w$.

9. The method of claim 8 wherein the offset reading is taken at least $t_e$ after the last reading during $t_w$.

10. The method of claim 1 further comprising reading the radiographic detector during successive time periods $t_r$ prior to obtaining the exposure reading, the successive $t_r$ readings being spaced by time periods $t_s$,
    and wherein $t_w \geq N(t_s + t_r) + t_e$, N being an integer number greater than or equal to 1.

11. The method of claim 10 wherein $t_w = N(t_s + t_r) + t_e$.

12. The method of claim 10 further comprising reading the radiographic detector for $t_r$ at least once during $t_w$.

13. The method of claim 12 wherein the offset reading is taken at least $t_e$ after the last reading during $t_w$.

14. A method of radiographic imaging comprising:
    a. reading a radiographic detector for a time period $t_r$, each such reading being preceded by a time period $t_s$;
    b. exposing the radiographic detector for a time period $t_e$;
    c. reading the radiographic detector for a time period $t_R$ to obtain an exposure reading;
    d. after a time period $t_w \geq N(t_s + t_r) + t_e$, wherein $N \geq 1$, reading the radiographic detector to obtain an offset reading;
    e. subtracting the offset reading from the exposure reading.

15. The method of claim 14 wherein $t_R$ is not equal to $t_r$.

16. The method of claim 14 wherein $t_R \geq t_r$.

17. The method of claim 14 wherein the radiographic detector is read N times during time period $t_w$.

18. A method of radiographic imaging comprising:
 a. reading a radiographic detector for at least one time period $t_r$;
 b. exposing the radiographic detector for a time period $t_e$;
 c. reading the radiographic detector for a time period $t_R$ to obtain an exposure reading;
 d. reading the radiographic detector N successive times, each reading lasting for $t_r$, N being an integer number greater than or equal to 1;
 e. after a time period $t_w > t_e$, reading the radiographic detector for $t_R$ to obtain an offset reading;
 f. subtracting the offset reading from the exposure reading.

19. The method of claim 18 wherein $t_w \geq Nt_r + t_e$.

20. The method of claim 18 wherein:

the N successive $t_r$ readings are spaced from each other by a time period $t_s$, and $t_w \geq N(t_s + t_r) + t_e$.

* * * * *